US009323691B2

(12) United States Patent
Ramaraju et al.

(10) Patent No.: US 9,323,691 B2
(45) Date of Patent: Apr. 26, 2016

(54) MULTIPLE PAGE SIZE MEMORY MANAGEMENT UNIT

(75) Inventors: Ravindraraj Ramaraju, Round Rock, TX (US); Eric V. Fiene, Austin, TX (US); Jogendra C. Sarker, Austin, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 583 days.

(21) Appl. No.: 13/415,196

(22) Filed: Mar. 8, 2012

(65) Prior Publication Data
US 2013/0238875 A1 Sep. 12, 2013

(51) Int. Cl.
*G06F 12/10* (2006.01)
(52) U.S. Cl.
CPC ...... *G06F 12/1027* (2013.01); *G06F 2212/652* (2013.01)
(58) Field of Classification Search
CPC .......... G06F 12/1027; G06F 2212/652; G06F 12/1036
USPC ........................................................ 711/207
See application file for complete search history.

(56) References Cited

U.S. PATENT DOCUMENTS

| 5,907,867 | A | 5/1999 | Shinbo et al. |
| 5,946,716 | A | 8/1999 | Karp et al. |
| 6,233,652 | B1 | 5/2001 | Mathews et al. |
| 6,591,341 | B1 * | 7/2003 | Sharma ......................... 711/122 |
| 6,715,057 | B1 | 3/2004 | Kessler et al. |
| 7,366,829 | B1 | 4/2008 | Luttrell et al. |
| 7,543,132 | B1 | 6/2009 | Grohoski et al. |
| 8,099,580 | B2 | 1/2012 | Ramaraju et al. |
| 2009/0106523 | A1 | 4/2009 | Steiss |
| 2010/0100685 | A1 * | 4/2010 | Kurosawa et al. ............ 711/128 |

OTHER PUBLICATIONS

Chang, Yen-Jeng et al., "Hybrid-Type CAM Design for Both Power and Performance Efficiency," IEEE Transactions on Very Large Scale Integration (VLSI) Systems, vol. 16, No. 8, Aug. 2008, pp. 965-974.
Juan, Toni et al., "Reducing TLB Power Requirements," IEEE Proceedings of 1997 International Symposium on Low Power Electronics and Design, Aug. 1997, ISBN-89791-903, pp. 196-201.

* cited by examiner

*Primary Examiner* — Jae Yu

(57) ABSTRACT

A memory management unit can receive an address associated with a page size that is unknown to the MMU. The MMU can concurrently determine whether a translation lookaside buffer data array stores a physical address associated with the address based on different portions of the address, where each of the different portions is associated with a different possible page size. This provides for efficient translation lookaside buffer data array access when different programs, employing different page sizes, are concurrently executed at a data processing device.

12 Claims, 10 Drawing Sheets

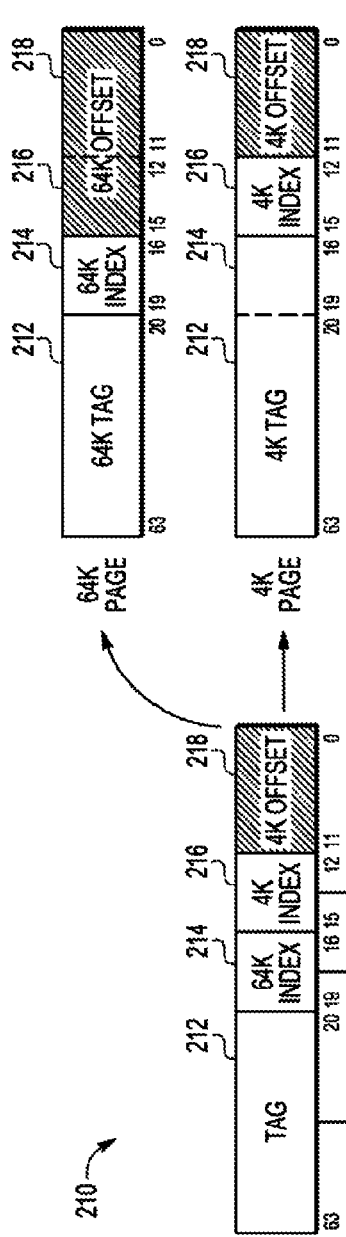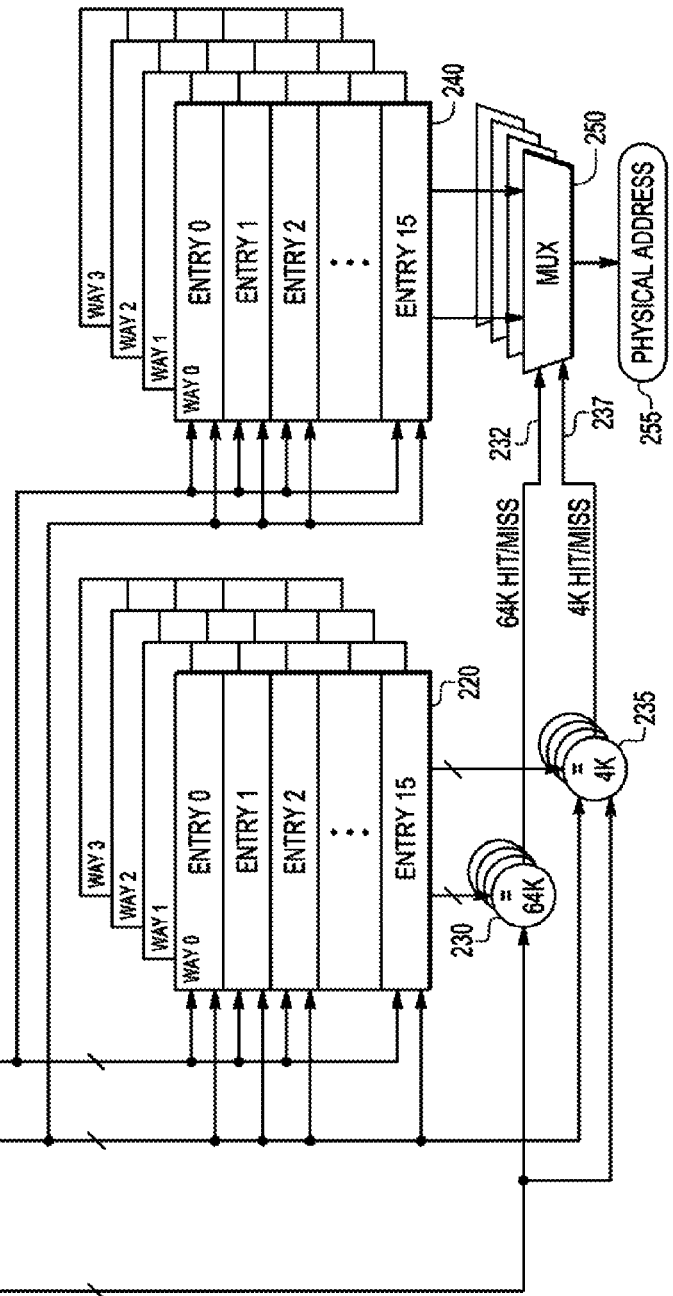
FIG. 2

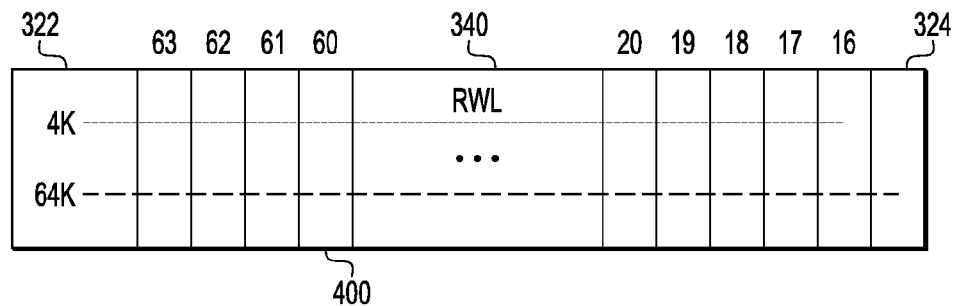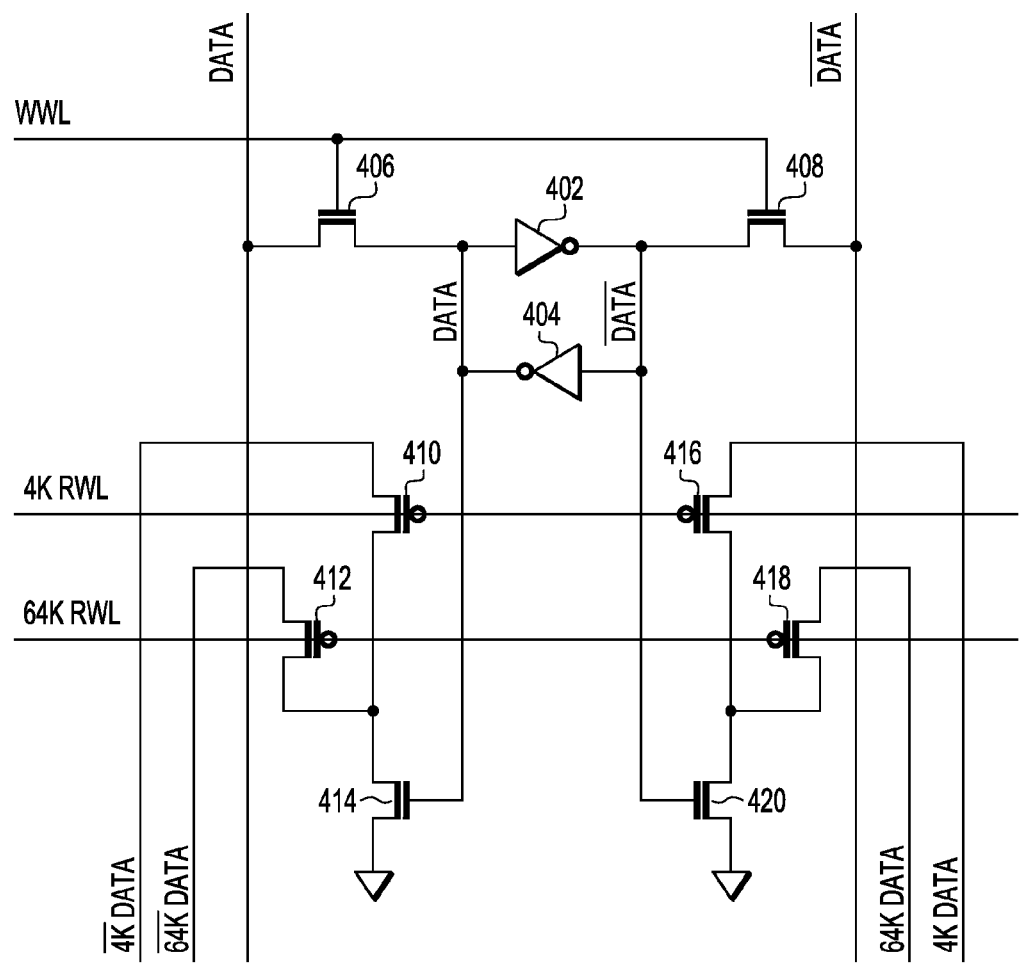
FIG. 4

US 9,323,691 B2

MULTIPLE PAGE SIZE MEMORY MANAGEMENT UNIT

FIELD OF THE DISCLOSURE

The present disclosure relates to electronic devices, and more particular to memory for electronic devices.

BACKGROUND

A memory management unit (MMU) is employed in an electronic device to handle data access requests. In particular, an MMU can determine if the data associated with an access request is available from a cache memory of the electronic device, or if the data resides in a main memory. In order to determine if data is available at the cache, the MMU can perform address translation to translate a received address to a tag value. The address translation is sometimes based on a page size, where the page size is indicative of the way a program executing at the electronic device allocates memory.

BRIEF DESCRIPTION OF THE DRAWINGS

The present disclosure may be better understood, and its numerous features and advantages made apparent to those skilled in the art by referencing the accompanying drawings.

FIG. 2 is a block diagram illustrating a particular embodiment of the memory management unit of FIG. 1 in accordance with one embodiment of the present disclosure;

FIG. 4 is a schematic diagram illustrating the bitcell of the translation lookaside buffer of FIG. 3 in accordance with one embodiment of the present disclosure;

DETAILED DESCRIPTION

Figure 1:
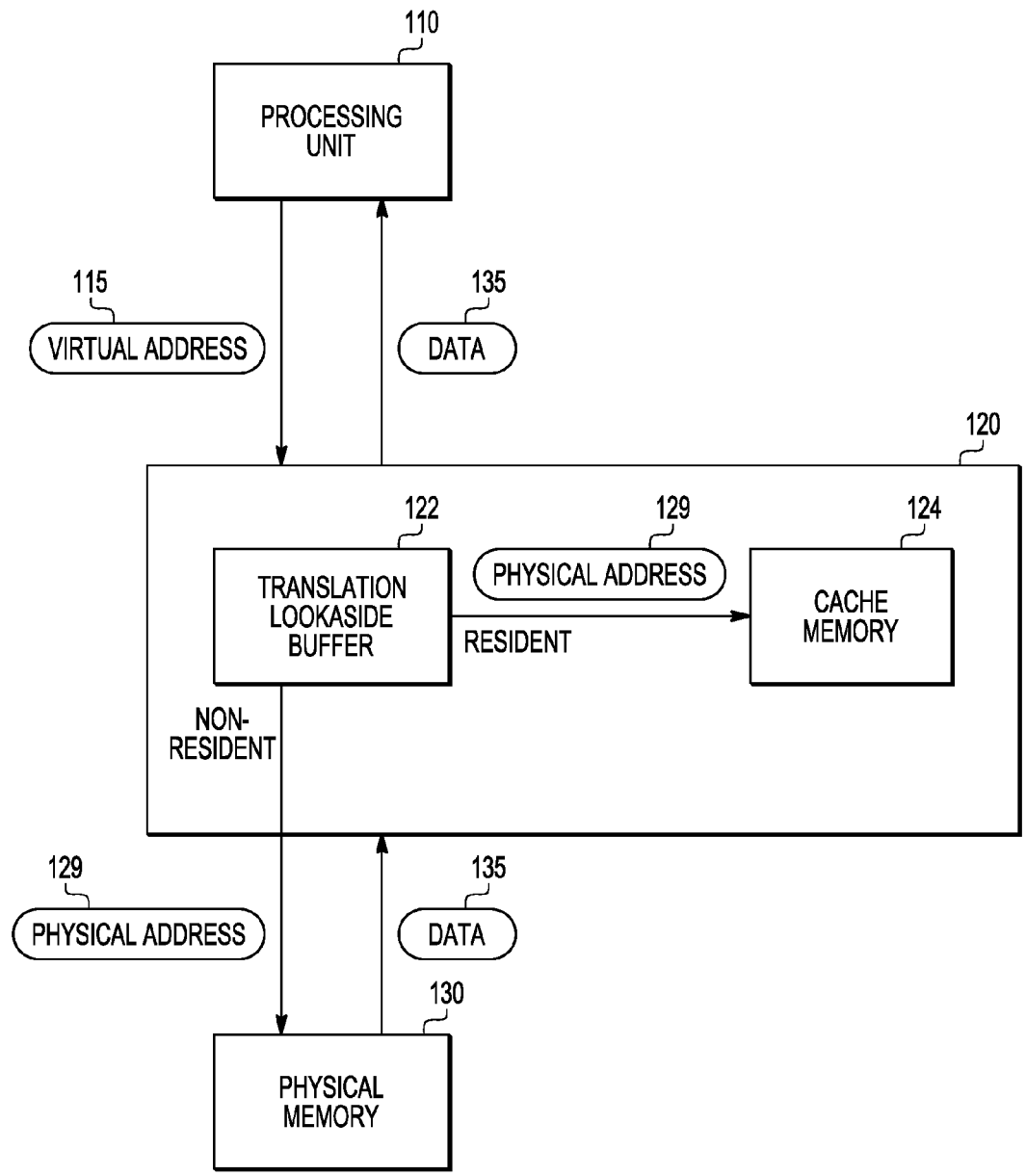
FIG. 1 is a block diagram illustrating an electronic device including a memory management unit in accordance with one embodiment of the present disclosure.

FIGS. 1-10 illustrate techniques for employing an MMU in an electronic device, whereby the MMU supports cache access using concurrent address translations for multiple page sizes. To illustrate, the MMU can receive an address associated with a page size that is unknown to the MMU. The MMU can concurrently determine whether a cache stores data associated with the address based on different portions of the address, where each of the different portions is associated with a different possible page size. This provides for efficient cache access when different programs, employing different page sizes, are concurrently executed at the electronic device.

For example, in one embodiment the MMU includes a multi-read port translation lookaside buffer (TLB) where each read port address is indexed to different page size indices. As used herein, a page size of an address refers to a fixed-length contiguous block of virtual memory that is the smallest unit of data for memory allocation performed by an operating system for a program executing at a data processing device. The MMU determines a cache hit for each page size based upon the received address. In particular, the MMU uses different portions of the received address as indexes into the multi-read port TLB. Each different portion of the received address is associated with a different page size. Each indexed entry in the TLB is compared to a tag from the received address, and if the entry matches the tag and the page size, then a HIT is indicated.

The TLB provides concurrent page size translations in an N-way set associative cache architecture, in order to determine a way hit. The entries of the TLB can include page size bits to indicate the page size of the tags stored in each entry. In one embodiment, a 4-way set associative MMU provides concurrent 4 kilobyte (K) and 64K page size translations by providing separate 4K and 64K indexes into a TLB tag array and a TLB data array, comparing an address tag with the tags stored at the index locations of the TLB tag array to provide separate 4K and 64K HIT/MISS signals, and selecting from the TLB data array the physical address data corresponding with a HIT.

In another embodiment, a 4-way set associative MMU provides concurrent 4K and 64K page size translations by providing an address tag and separate 4K and 64K indexes to a TLB tag array that is implemented by a content addressable memory (CAM) to provide separate 4K and 64K HIT/MISS signals for the indexed entries, and providing from the TLB data array the physical address data corresponding with a HIT. The disclosed embodiments are illustrative, and one of ordinary skill in the art will appreciate that other implementations are possible. For example, the skilled artisan will appreciate, based upon the following descriptions, that N-way set associative architectures, where N is greater than or less than four are possible, as are implementations with different page sizes, or implementations that provide for more than two page size translations.

FIG. 1 illustrates an electronic device 100 that includes a processing unit 110, an MMU 120, and a physical memory 130. MMU 120 includes a TLB 122, and a cache memory 124. MMU 120 is connected to processing unit 110 and to physical memory 130. TLB 122 is connected to cache memory 124. In a particular embodiment, electronic device 100 represents a central processing unit (CPU) that implements a virtual memory architecture. As such, processing unit 110 can represent an execution unit of the CPU that issues requests for data or instructions for processing. Further, MMU 120 can represent a memory interface of the CPU between the execution unit and physical memory 130, where physical memory 130 is included in electronic device 100, such as a second level cache of the CPU. In another embodiment, MMU 120 can represent a memory interface with an external memory of a system that includes electronic device 100 and main memory 130 as separate components.

In operation, processing unit 110 issues a read request to MMU 120. The request includes a virtual address 115 that is received by TLB 122. TLB 122 determines if virtual address 115 points to data that is currently resident in cache memory 124. If the data is resident in cache memory 124, then TLB 122 translates virtual address 115 into a physical address 129, issues physical address 129 to cache memory 124, and MMU 120 provides data 135 to processing unit 110 from cache memory 124. If virtual address 115 does not point to data that is currently resident in cache memory 124, then TLB 122 translates virtual address 115 into physical address 129, issues physical address 129 to physical memory 130. Physical memory 130 then provides data 135 to MMU 120, and MMU 120 provides data 135 to processing unit 110.

MMU 120 supports concurrent page size translations for multiple page sizes. As such, TLB 122 includes a multi-read port to index multiple index fields of virtual address 115 for the different page sizes. TLB 122 thereby provides concurrent page size translations. As such a HIT in TLB 122 can represent multiple HIT/MISS signals, each associated with a different page size and way HIT/MISS status for TLB 122. Thus in one embodiment the entries of TLB 122 include page size bits to indicate the page size of the tags stored in each entry.

FIG. 2 illustrates an MMU 200 corresponding to a particular embodiment of MMU 120, and including a TLB tag array 220, 64K comparison blocks 230, 4K comparison blocks 235, a TLB data array 240, and multiplexers (MUXs) 250. MMU 200 operates to receive a virtual address 210 from processing unit 110, determine if data associated with virtual address 210 is resident in TLB data array 240, and if resident, to provide the physical address 255 to a cache corresponding to a particular embodiment of cache 124. Virtual address 210 includes a tag field 212, a 64K index field 214, a 4K index field 216, and a 4K page offset field 218. TLB tag array 220 is organized as a 4-way set associative TLB with sixteen (16) tag entries per way. 64K comparison blocks 230 include a separate comparison block for each way of TLB tag array 220 and are configured to provide comparisons for 64K indexed tags from TLB tag array 220. 4K comparison blocks 235 include a separate comparison block for each way of TLB tag array 220 and are configured to provide comparisons for 4K indexed tags from TLB tag array 220. TLB data array 240 is organized as a 4-way set associative cache with sixteen (16) data entries per way. Each way of TLB tag array 220 is uniquely associated with a corresponding way of TLB data array 240. MUXs 250 include a separate multiplexer for each way of TLB data array 240 and are configured to provide data from a selected entry of a way that is associated with a 64K HIT or a 4K HIT.

As illustrated, virtual address 210 can represent an address for a 64K page or for a 4K page. When representing an address for a 64K page, virtual address 210 includes a 64K offset (15 . . . 0) including 4K offset field 218 and 4K index field 216, a 64K index (19 . . . 16) including 64K index field 214, and a 64K page tag (63 . . . 20) including tag field 212. The 64K offset represents bits of virtual address 210 that are not evaluated in determining a 64K page size HIT. The 64K index provides for the indexing into the sixteen entries of each way of TLB tag array 220 and TLB data array 240. The 64K tag provides the tag address that is compared with the 64K indexed tag entry from each way of TLB tag array 220 by 64K comparison blocks 230. When representing an address for a 4K page, virtual address 210 includes a 4K offset (11 . . . 0) including 4K offset field 218, a 4K index (15 . . . 12) including 4K index field 216, and a 4K page tag (63 . . . 16) including 64K index field 214 and tag field 212. The 4K offset represents bits of virtual address 210 that are not evaluated in determining a 4K page size HIT. The 4K index provides for the indexing into the sixteen entries of each way of TLB tag array 220 and TLB data array 240. The 4K tag provides the tag address that is compared with the 4K indexed tag entry from each way of TLB tag array 220 by 4K comparison blocks 235.

The bits from tag field 212 are provided to a first input of 64K comparison blocks 230 and to a first input of 4K comparison blocks 235. The bits from 64K index field 214 are provided to a second input of 4K comparison blocks 235 and also provided to a first input of each entry of each way of TLB tag array 220 and of TLB data array 240. The bits from 4K index field 216 are provided to a second input of each entry of each way of TLB tag array 220 and of TLB data array 240. Each way of TLB tag array 220 includes a first tag output (63 . . . 16) that is provided to a second input of the associated 64K comparison block 230, and a second tag output (63 . . . 16) that is provided to a third input of the associated 4K comparison block 235. Each comparison block of 64K comparison blocks 230 includes a 64K HIT/MISS 232 output that is provided to a first selector input of an associated MUX 250. Each comparison block of 4K comparison blocks 235 includes a 4K HIT/MISS 237 output that is provided to a second selector input of an associated MUX 250. Each way of TLB data array 240 includes a first data output that is provided to a first data input of the associated MUX 250, and a second data output that is provided to a second data input of the associated MUX. MUXs 250 include an output that provides physical address 255 to the cache.

In operation, each of 64K index field 214 and 4K index field 216 functions to select an entry in each way of TLB tag array 220. In particular, the value provided in the four bits of 64K index field 214 encodes for one of the sixteen entries in each way of TLB tag array 220. Similarly, the value provided in the four bits of 4K index field 216 encodes for one of the sixteen entries in each way of TLB tag array 220. The entry selected by 64K index field 214 can be the same entry as is selected by 4K index field 216, or can select a different entry. The tag entry in each way that is selected by 64K index field 214 is provided to the associated 64K comparison block 230 for comparison with the 64K page tag. 64K comparison blocks 230 determine if any of the selected tag entries match the 64K page tag. If so, the 64K HIT/MISS output 232 of the associated 64K comparison block 230 indicates a HIT, while the other 64K HIT/MISS outputs 232 each indicate a MISS. The tag entry in each way that is selected by 4K index field 216 is provided to the associated 4K comparison block 235 for comparison with the 4K page tag. 4K comparison blocks 235 determine if any of the selected tag entries match the 4K page tag. If so, the 4K HIT/MISS output 237 of the associated 4K comparison block 235 indicates a HIT, while the other 4K HIT/MISS outputs 237 each indicate a MISS. The data entry in each way of TLB data array 240 that is selected by 64K index field 214 is provided to the first data input of the associated MUX 250, and data entry that is selected by 4K index field 216 is provided to the second data input of the associated MUX. An indicated hit from one of 64K comparison blocks 230 or 4K comparison blocks 235 operates to select the associated data input from MUXs 250, while all other HIT/MISS signals indicate a MISS, and the data inputs associated with a MISS are not selected at MUX 250. The selected data input is provided to the cache as physical address 255. Only one of 64K comparison blocks 230 and 4K comparison blocks 235 will indicate a HIT, as described below with respect to FIG. 3. Further, if no 64K HIT/MISS output 232 or 4K HIT/MISS output 237 indicates a HIT, then MMU 200 operates to determine a physical address associated with virtual address 210, as described above.

Figure 3:
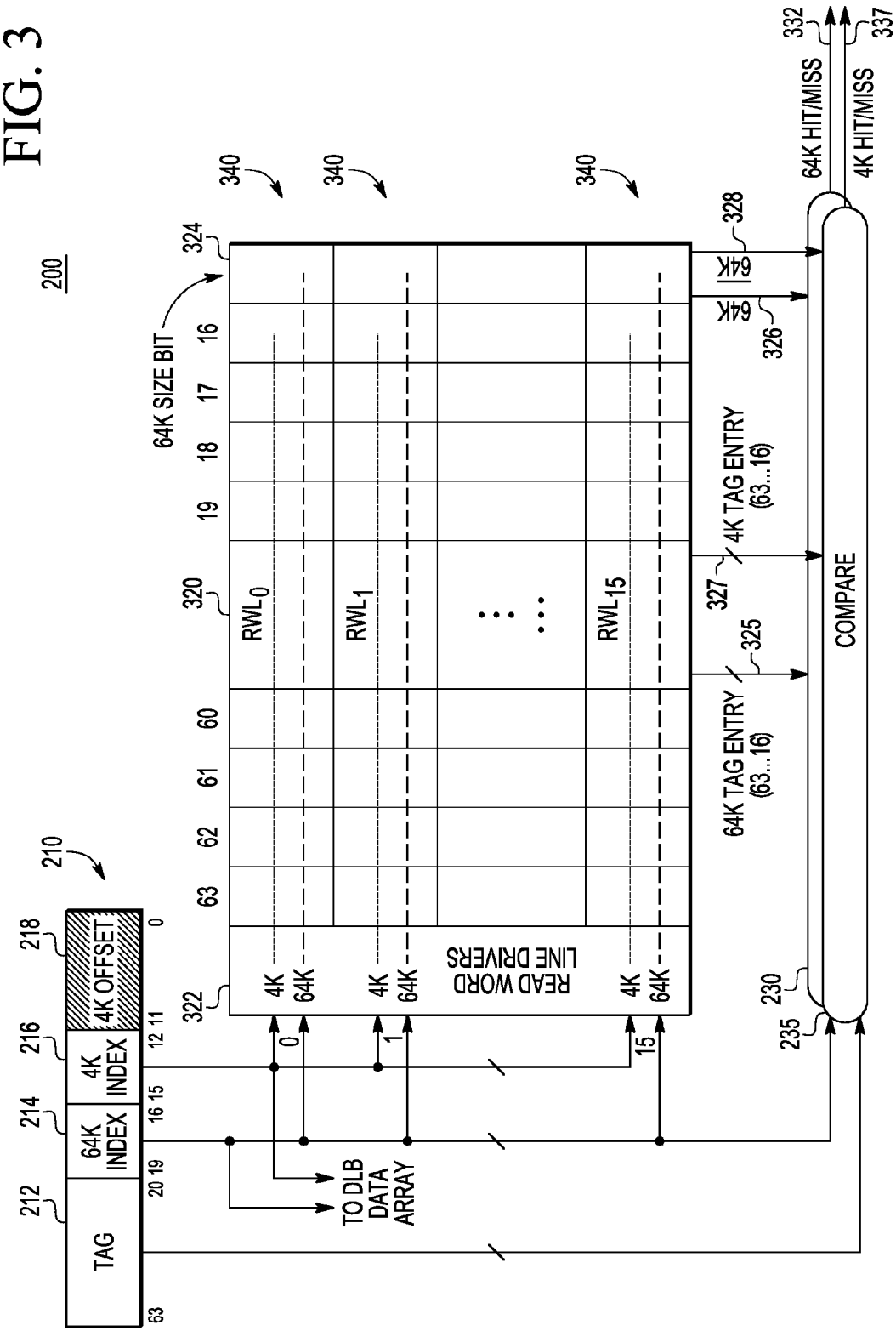
FIG. 3 is a block diagram illustrating a translation lookaside buffer of the memory management unit of FIG. 2 in accordance with one embodiment of the present disclosure.

FIG. 3 illustrates a portion of MMU 200, including one way 320 of TLB tag array 220, the associated 64K comparison block 230, and the associated 4K comparison block 235. Way 320 includes read word line drivers 322 and a 64K size bit field 324 for each entry 340 of the way. Read word line drivers 322 comprise a 4K read word line driver and a 64 K word line driver for each entry 340 of way 320. Each entry 340 of way 320 also includes tag bits (63 . . . 16). In operation, 64K index field 214 selects one of the entries 340 of way 320, the 64K read word line driver for the selected entry 340 is activated, and the selected tag is provided to the second input 325 of 64K comparison block 230. In addition, the 64K size bit 324 from the selected entry 340 is provided to a third input 326 of 64K comparison block 230. If the tag in the selected entry 340 is a 64K tag, then the associated 64K size bit 324 is true, indicating that the tag is a 64K tag, enabling 64K comparison block 230 to compare the tag provided on the first input and the tag provided on second input 325, and the HIT or MISS is indicated on 64K HIT/MISS signal 332. However, if the tag in the selected entry 340 is a 4K tag, then the associated 64K size bit 324 is false, 64K comparison block 230 is disabled, and a MISS is indicated on 64K HIT/MISS signal 332. In a particular embodiment, 4K index field 216 bits (15 . . . 12) are not provided to the first input of 64K comparison block 230 and bits (15 . . . 12) of the selected tag are not provided to the second input of the 64K comparison block, the comparison of bits (15 . . . 12) being unnecessary because they will always match.

Similarly, 4K index field 216 selects one of the entries 340 of way 320, the 4K read word line driver for the selected entry 340 is activated, and the selected tag is provided to the second input 327 of 4K comparison block 235. In addition, the compliment of 64K size bit 324 from the selected entry 340 is provided to a third input 328 of 4K comparison block 235. If the tag in the selected entry 340 is a 4K tag, then the associated 64K size bit 324 is false, enabling 4K comparison block 235 to compare the tag provided on the first input and the tag provided on second input 327, and the HIT or MISS is indicated on 4K HIT/MISS signal 337. However, if the tag in the selected entry 340 is a 64K tag, then the associated 64K size bit 324 is true, 4K comparison block 235 is disabled, and a MISS is indicated on 4K HIT/MISS signal 337.

FIG. 4 illustrates a bitcell 400 of entry 340 comprising inverters 402 and 404, and field effect transistors (FETs) 406, 408, 410, 412, 414, 416, 418, and 420. Bitcell 400 receives a write word line (WWL) input, a DATA input, an inverted DATA input, a 4K read word line (4K RWL) input, a 64K read word line (64K RWL), a 4K DATA output, an inverted 4K DATA output, a 64K DATA output, and an inverted 64K DATA output. The WWL input is connected to a gate electrode of FET 406, and a gate electrode of FET 408. The DATA input is connected to a first current electrode of FET 406. A second current electrode of FET 406 is connected to an input electrode of inverter 402, to an output of inverter 404, and a gate electrode of FET 414. An output of inverter 402 is connected to an input of inverter 404, a first current electrode of FET 408, and a gate electrode of FET 420. The inverted DATA input is connected to a second current electrode of FET 408.

A first current electrode of FET 414 is connected to a signal ground. A second current electrode of FET 414 is connected to a first current electrode of FET 410 and a first current electrode of FET 412. The 4K RWL input is connected to a gate electrode of FET 410, and a gate electrode of FET 416. A second current electrode of FET 410 provides the inverted 4K DATA output. The 64K RWL input is connected to a gate electrode of FET 412, and a gate electrode of FET 418. A second current electrode of FET 412 provides the inverted 64K DATA output. A first current electrode of FET 420 is connected to a signal ground. A second current electrode of FET 420 is connected to a first current electrode of FET 416 and a first current electrode of FET 418. A second current electrode of FET 416 provides the 4K DATA output. A second current electrode of FET 418 provides the 64K DATA output.

In operation, inverters 402 and 404 store a bit of data, with the data bit latched at the input of inverter 402 and the output of inverter 404, and the inverted data bit at the output of inverter 402 and the input of inverter 404. A data bit is stored in the latch when the data bit is placed on the DATA input, the inverted data bit is placed on the inverted DATA input, and the WWL input is asserted. The stored data bit is read when one or more of the 4K RWL input and the 64K RWL input is asserted. For example, when the latch stores a logic "0", FET 414 is turned off, and FET 420 is turned on. Then, when the 4K RWL input is asserted, FETs 410 and 416 are turned on. With both FETs 416 and 420 turned on, the 4K DATA output is pulled to ground, providing an output of a logic "0." Also, with FET 414 turned off, the inverted 4K DATA output floats high, providing an output of a logic "1". Similarly, when the 64K RWL input is asserted, FETs 412 and 418 are turned on. With both FETs 416 and 418 turned on, the 64K DATA output is pulled to ground, providing an output of a logic "0," and FET 414 is turned off, providing the inverted 64K DATA output of a logic "1." The operation of bitcell 400 can be implemented using other logic element than inverters and FETs, as needed or desired.

Figure 5:
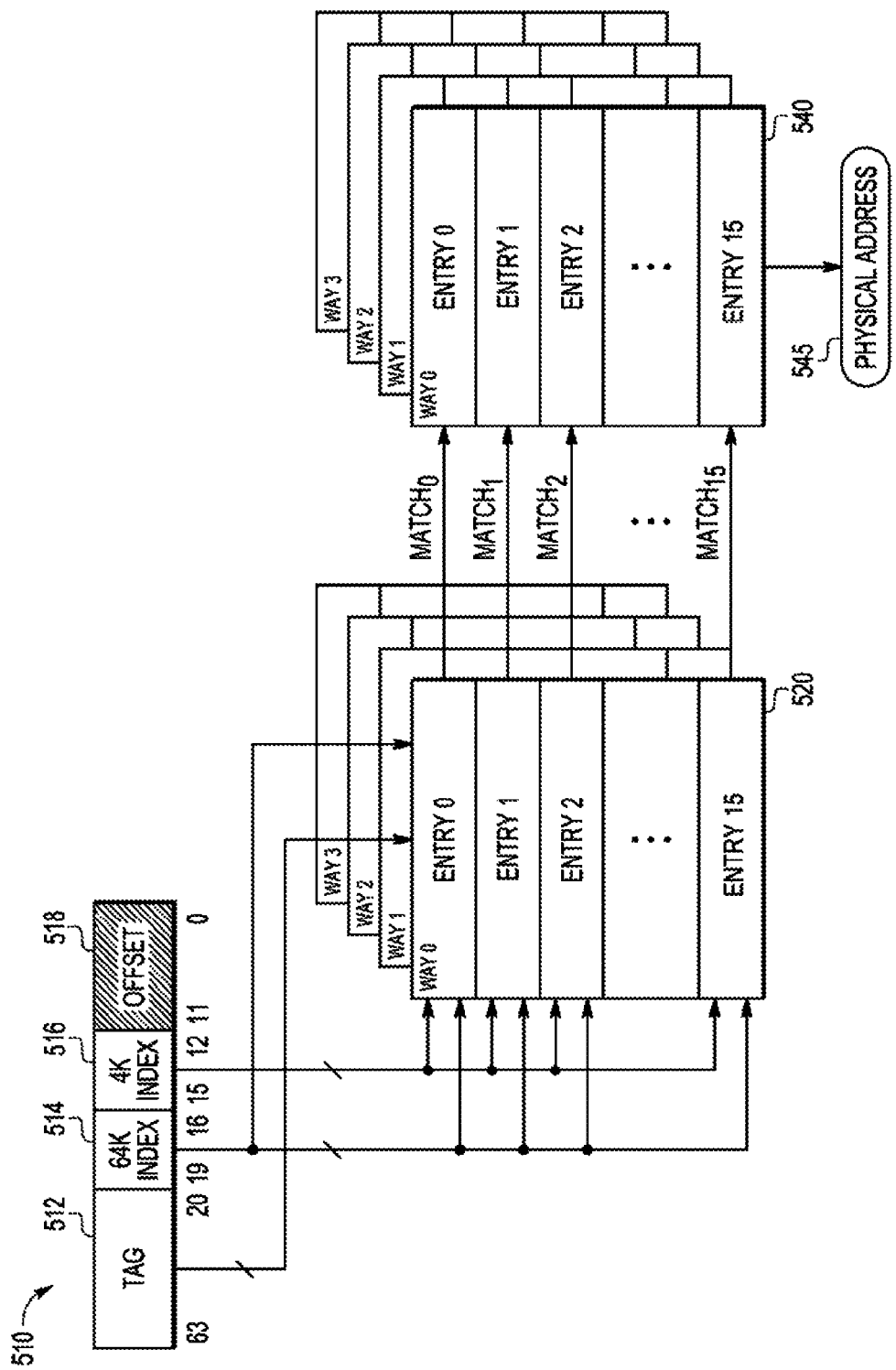
FIG. 5 is a block diagram illustrating another embodiment of the memory management unit of FIG. 1 in accordance with one embodiment of the present disclosure.

FIG. 5 illustrates an MMU 500 corresponding to a particular embodiment of MMU 120, and including a TLB tag array 520 and a TLB data array 540. MMU 500 operates to receive a virtual address 510, determine if data associated with the virtual address is resident in TLB data array 540, and if resident, to provide the physical address 545 to a cache corresponding to a particular embodiment of cache 124. Virtual address 510 includes a tag field 512, a 64K index field 514, a 4K index field 516, and a 4K page offset field 518. TLB tag array 520 is organized as a 4-way set associative TLB with sixteen (16) tag entries per way. TLB data array 540 is organized as a 4-way set associative cache with sixteen (16) data entries per way. Each way of TLB tag array 520 is uniquely associated with a corresponding way of TLB data array 540.

Virtual address 510 can represent an address for a 64K page or a 4K page. As a 64K page, virtual address 510 includes a 64K offset comprising 4K page offset field 518 bits (11 . . . 0) and 4K index field 516 bits (15 . . . 12) and that represent the don't care bits for the 64K page size in MMU 500, 64K index field 514 comprising bits (19 . . . 16) that provide for indexing into the sixteen entries of each way of TLB tag array 520, and an associated 64K page tag comprising tag field 212 bits (63 . . . 20). As a 4K page, virtual address 510 includes 4K page offset field 518 comprising bits (11 . . . 0) that represent the don't care bits for the 4K page size in MMU 500, 4K index field 516 comprising bits (15 . . . 12) that provide for indexing into the sixteen entries of each way of TLB tag array 220, and an associated 4K page tag comprising 64K index field 514 bits (19 . . . 16) and tag field 512 bits (63 . . . 20).

Tag field 212 and 64K index field 214 are connected to a data input of each way of TLB tag array 520. 64K index field 514 is also connected to a first input of each entry of each way of TLB tag array 520. 4K index field 516 is connected to a second input of each entry of each way of TLB tag array 520. Each entry of each way of TLB tag array 520 includes a match output that is connected to an associated entry of TLB data array 540. Each way of TLB data array 540 includes a data output to provide physical address 545 to the cache.

In operation, each of 64K index field 514 and 4K index field 516 functions to select an entry in each way of TLB tag array 520. The tag entry in each way that is selected by 64K index field 514 is compared with the 64K page tag to determine if any of the selected tag entries match the 64K page tag. If so, the match output for the matching entry is asserted and the data entry in the associated entry of TLB data array 540 that is selected and physical address 255 is provided to processing unit 110. Only one entry in one way of TLB tag array 520 will be asserted, as described below with respect to FIG. 6. Further, if no match output is asserted, then MMU 500 operates to determine a physical address associated with virtual address 510, as described above.

Figure 6:
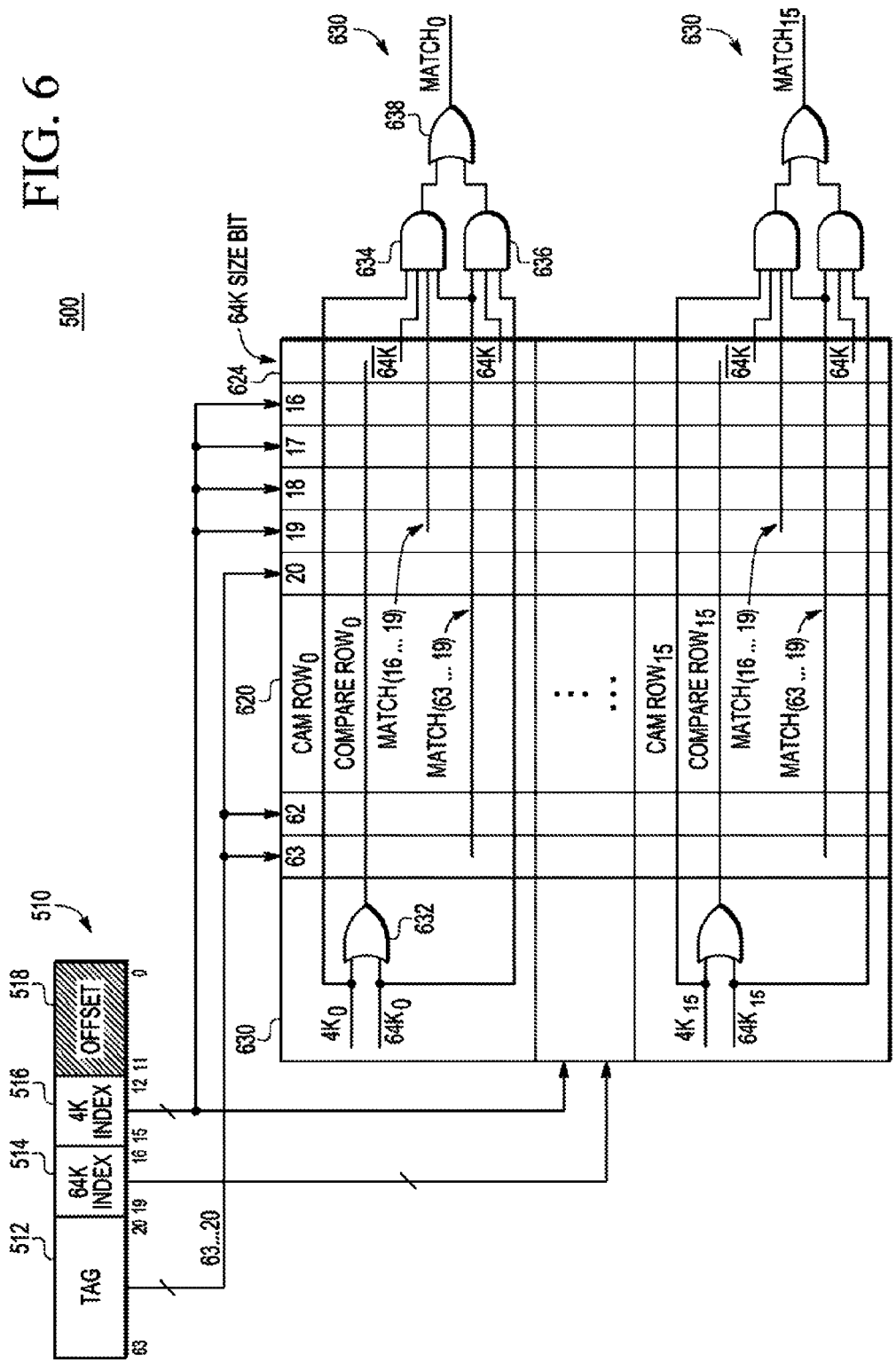
FIG. 6 is a block diagram illustrating a translation lookaside buffer of the memory management unit of FIG. 5 in accordance with one embodiment of the present disclosure.

FIG. 6 illustrates a portion of MMU 500, including one way 620 of TLB tag array 520. Way 620 is implemented as a CAM and includes compare row and match logic 630 and a 64K size bit 624 for each entry of the way. The compare row and match logic 630 for each entry stores tag entry bits (63 . . . 16) and includes OR-gates 632 and 638, and AND-gates 634 and 636. A 4K compare row signal is provided to a first input of OR-gate 632, and to a first input of AND-gate 634. A 64K compare row signal is provided to a second input of OR-gate 632, and to a first input of AND-gate 636. An output of OR-gate 632 provides a compare row signal that initiate a comparison of the tag entry bits (63 . . . 16) with the 4K page tag bits (63 . . . 16). The inverted 64K bits size bit is provided to a second input of AND-gate 634. A match status for the comparison of bits (19 . . . 16) is provided to a third input of AND-gate 634. A match status for the comparison of bits (63 . . . 16) is provided to a fourth input of AND-gate 634. An output of AND-gate 634 is provided to a first input of OR-gate 638. The 64K bits size bit is provided to a second input of AND-gate 636. The match status for the comparison of bits (63 . . . 16) is provided to a third input of AND-gate 636. An output of AND-gate 636 is provided to a second input of OR-gate 638. An output of OR-gate 638 provides the match output for the entry. In a particular embodiment, logic gates 634, 636 and 638 are implemented using a suitable AND-OR-Invert (AOI) logic gate and an inverter at the output of the AOI-gate.

In operation, 4K index field 516 selects an entry in way 620 and asserts the 4K row signal in the 4K indexed entry, and 64K index field 514 selects an entry in the way and asserts the 64K row signal in the 64K indexed entry. If either the 4K row signal or the 64K row signal for a particular entry is asserted, the compare row signal for that entry is asserted. AND-gate 634 provides a 4K match function, such that when the 4K row signal is asserted, the match status for bits (19 . . . 16) is asserted, and the match status for bits (63 . . . 16) is asserted, then the selected entry includes a tag entry that matches the 4K page tag, and the output of AND-gate 634 is asserted. Similarly, AND-gate 636 provides a 64K match function, such that when the 64K row signal is asserted, the 64K size bit is asserted, and the match status for bits (63 . . . 16) is asserted, then the selected entry includes a tag entry that matches the 64K page tag, and the output of AND-gate 636 is asserted. If either output of AND-gate 634 or AND-gate 636 is asserted, then the match output for the entry is asserted, and the associated entry of TLB data array 540 is selected.

Figure 7:
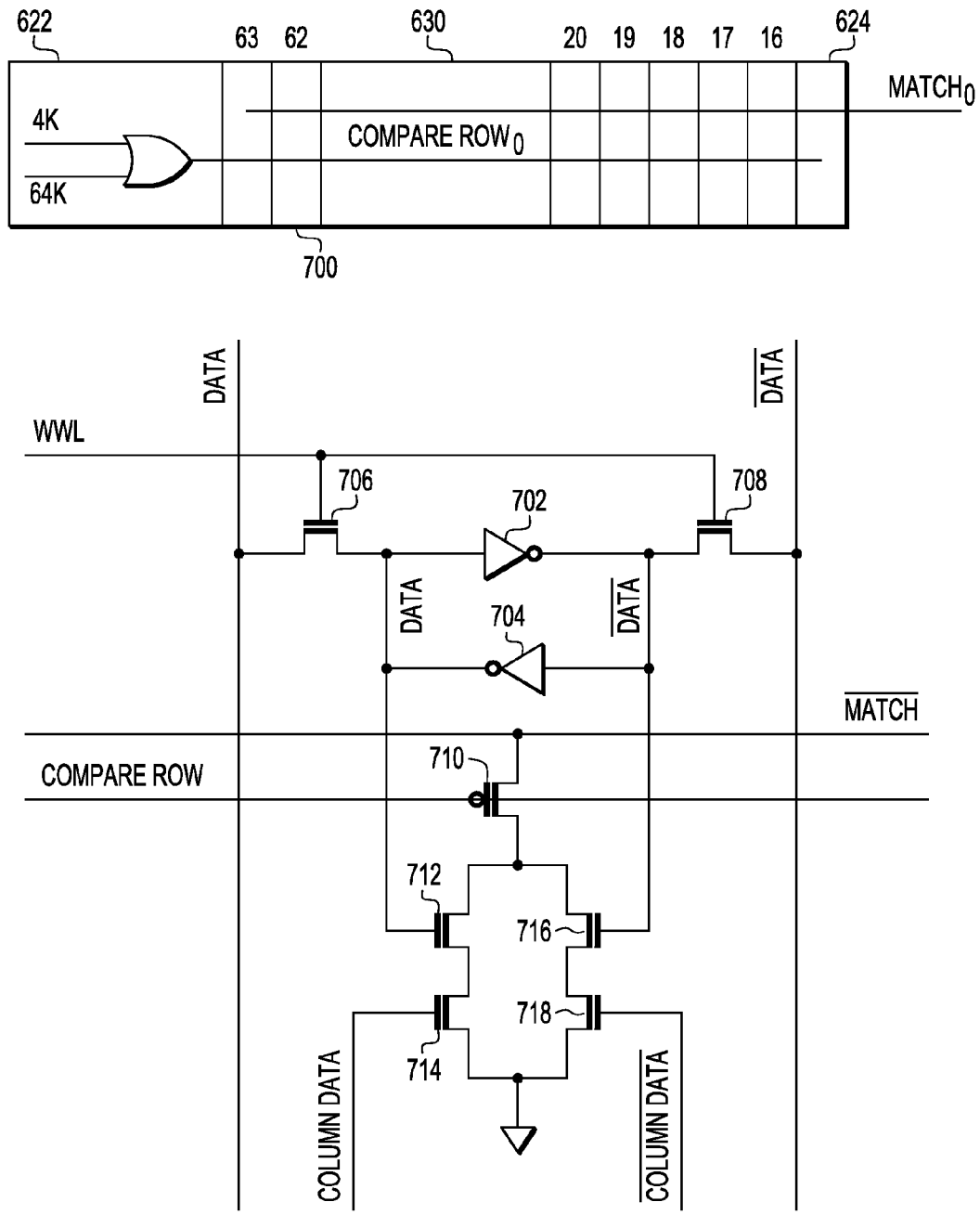
FIG. 7 is a schematic diagram illustrating the bitcell of the translation lookaside buffer of FIG. 6 in accordance with one embodiment of the present disclosure.

FIG. 7 illustrates a bitcell 700 of compare row and match logic 630 comprising inverters 702 and 704, and field effect transistors (FETs) 706, 708, 710, 712, 714, 716, and 718. Bitcell 700 receives a WWL input, a DATA input, an inverted DATA input, a compare row input, a column data input, an inverted column data input, and an inverted match output. The WWL input is connected to a gate electrode of FET 706, and a gate electrode of FET 708. The DATA input is connected to a first current electrode of FET 706. A second current electrode of FET 706 is connected to an input electrode of inverter 702, to an output of inverter 704, and a gate electrode of FET 712. An output of inverter 702 is connected to an input of inverter 704, a first current electrode of FET 708, and a gate electrode of FET 716. The inverted DATA input is connected to a second current electrode of FET 708.

The compare row input is connected to a gate electrode of FET 710. A first current electrode of FET 710 is connected to the inverted match output. A second current electrode of FET 710 is connected to a first current electrode of FET 712 and a first current electrode of FET 716. A second current electrode of FET 712 is connected to a first current electrode of FET 714. A second current electrode of FET 714 is connected to a signal ground. The column data input is connected to a gate electrode of FET 714. A second current electrode of FET 716 is connected to a first current electrode of FET 718. A second current electrode of FET 718 is connected to the signal ground. The inverted column data input is connected to a gate electrode of FET 718.

Inverters 702 and 704 operate similarly to inverters 402 and 404 to store a bit of data, and FETs 706 and 708 operate similarly to FETs 406 and 408 to store a bit in the latch when the WWL input is asserted. When the compare row input is asserted, then FET 710 is turned on, and the bit value stored in the latch is compared with the column data input, and if the stored bit value matches the column data input, then the inverted match output is deasserted, indicating a match. For example, when the latch stores a logic "0", FET 712 is turned off, and FET 716 is turned on. If the column data input includes a logic "0", then FET 714 is turned off. However, the inverted column data input operates to turn on FET 718. With both FETs 716 and 718 turned on, the inverted match output is pulled to ground, providing an output of a logic "0," thereby indicating a match. If the column data input includes a logic "1", then FET 714 is turned on and FET 718 is turned off. With both FETs 712 and 718 turned off, the inverted match output floats high, providing an output of a logic "1," thereby indicating no match.

Figure 8:
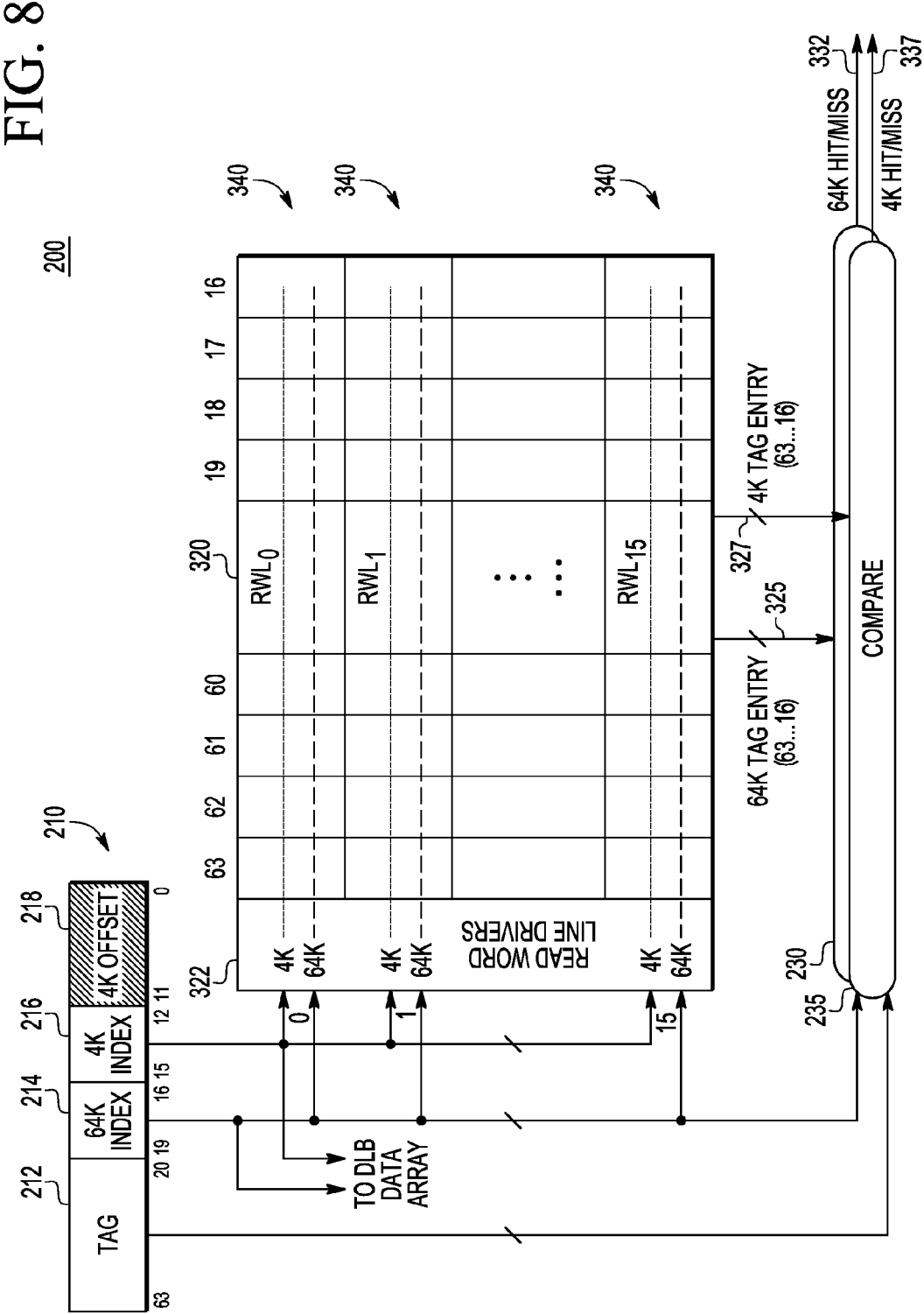
FIG. 8 is a block diagram illustrating a translation lookaside buffer of the memory management unit of FIG. 2 in accordance with another embodiment of the present disclosure.

FIG. 8 illustrates another embodiment of a portion of MMU 200, including virtual address 210, way 320 of TLB tag array 220, the 64K comparison block 230, and the associated 4K comparison block 235. Way 320 includes read word line drivers 322 for each entry 340 of the way. Read word line drivers 322 comprise a 4K read word line driver and a 64K word line driver for each entry 340 of way 320. In this embodiment, way 320 does not include a 64K size bit 324 for each entry 340, nor third inputs 326 or 328. Here, processing unit 110 unit is either configured to ensure that both a 64K page hit and a 4K page hit cannot occur at the same time, or is configured such that, if both a 64K page hit and a 4K page hit occur at the same time, processing unit 110 implements a priority scheme to select either the 64K page hit, or the 4K page hit. For example, processing unit 110 can implement a priority scheme whereby, when both a 64K page hit and a 4K page hit occur at the same time, processing unit 110 selects the 64K page hit. In a particular embodiment, where processing unit 110 implements a priority scheme to select either the 64K page hit, or the 4K page hit, the selected page size can be assigned as needed or desired.

Figure 9:
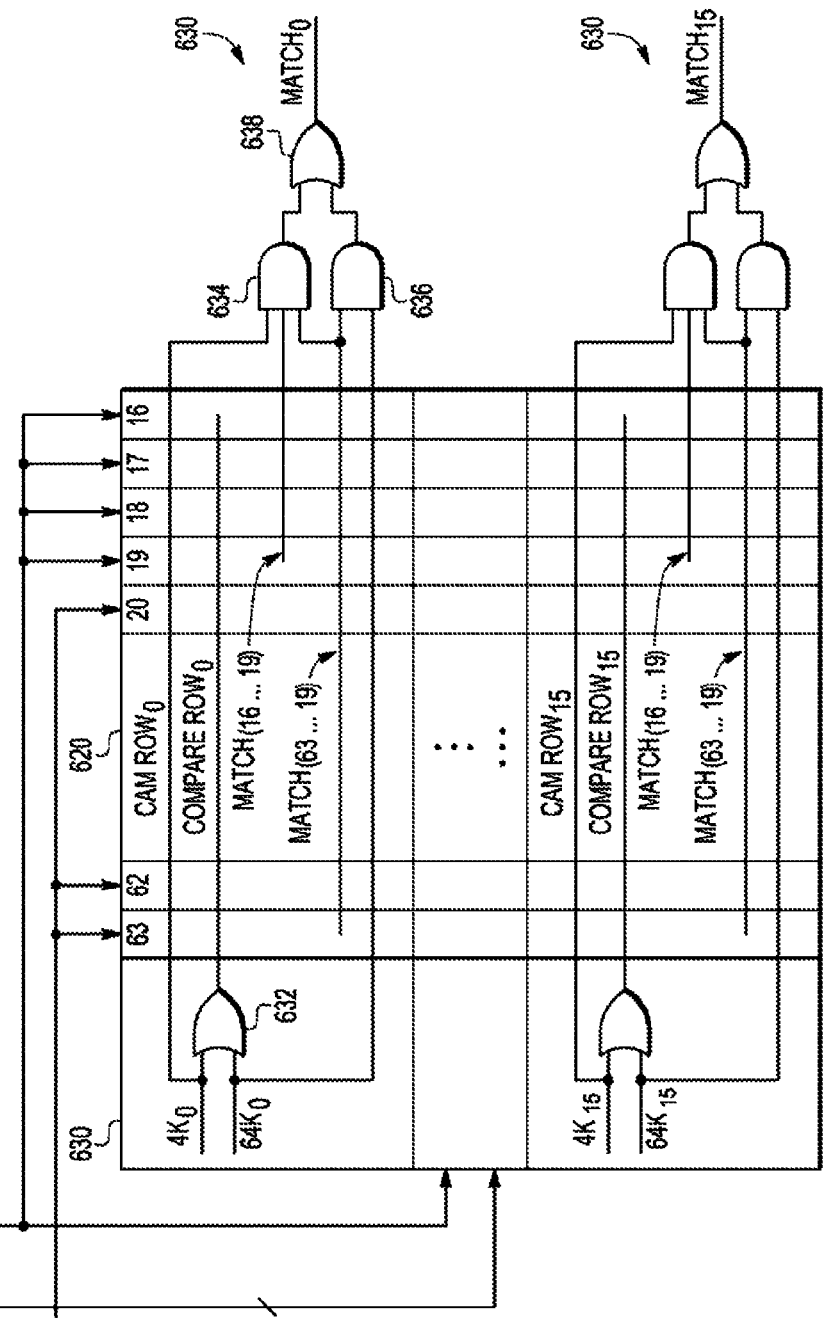
FIG. 9 is a block diagram illustrating a translation lookaside buffer of the memory management unit of FIG. 5 in accordance with another embodiment of the present disclosure.

FIG. 9 illustrates another embodiment of a portion of MMU 500, including virtual address 510 and one way 620 of TLB tag array 520. Way 620 is implemented as a CAM and includes compare row and match logic 630 for each entry of the way. In this embodiment, way 620 does not include a 64K size bit 624 for each compare row and match logic 630. Here, processing unit 110 is either configured to ensure that both a 64K page hit and a 4K page hit cannot occur at the same time, or is configured such that, if both a 64K page hit and a 4K page hit occur at the same time, processing unit 110 implements a priority scheme to select either the 64K page hit, or the 4K page hit.

Figure 10:
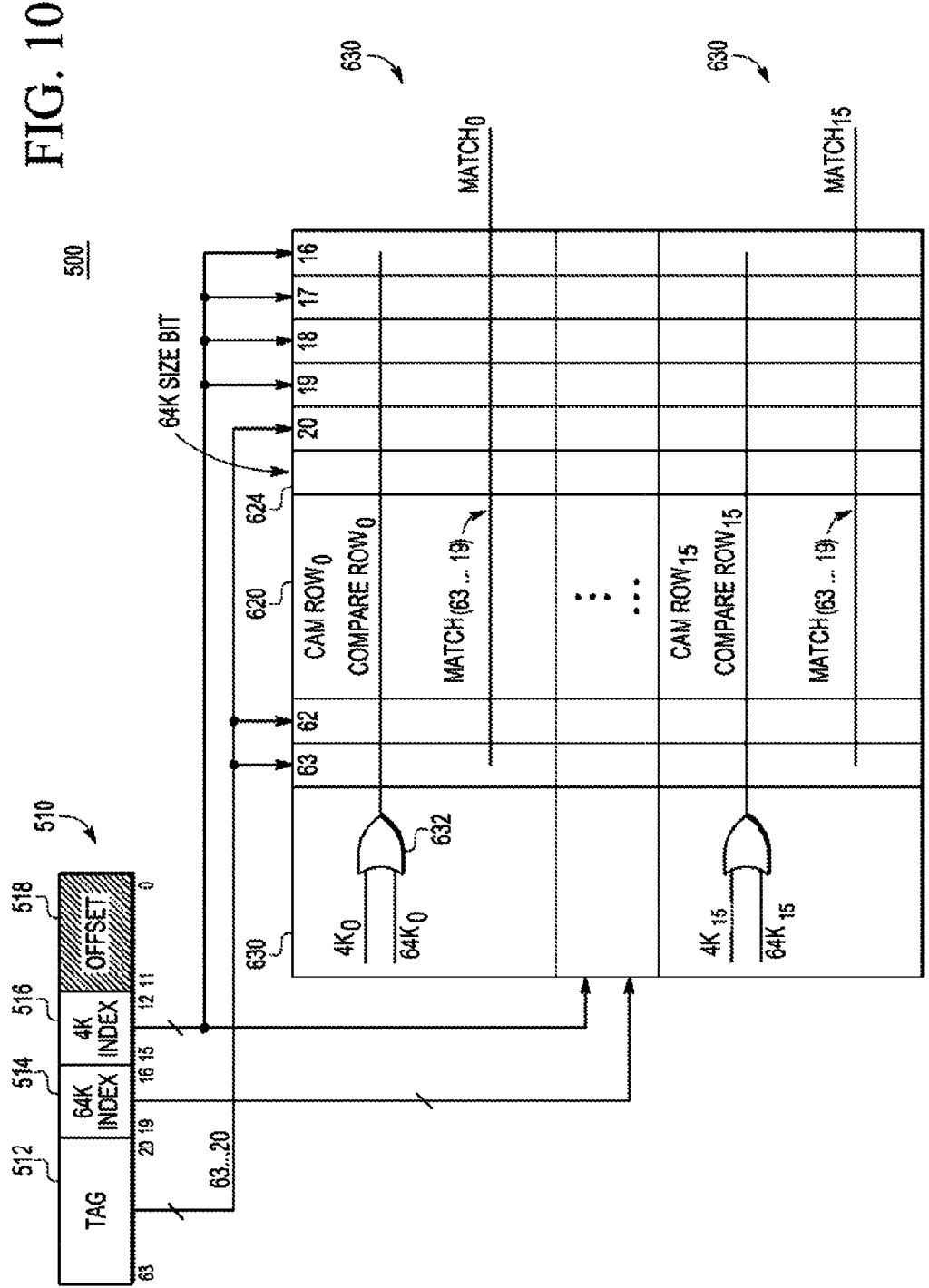
FIG. 10 is a block diagram illustrating a translation lookaside buffer of the memory management unit of FIG. 5 in accordance with another embodiment of the present disclosure.

FIG. 10 illustrates a portion of MMU 500, including virtual address 510 and one way 620 of TLB tag array 520. Way 620 is implemented as a CAM and includes compare row and match logic 630 and a 64K mask bit 625 for each entry of the way. In this embodiment, the compare row and match logic 630 for each entry does not include includes AND-gates 634 and 636, and OR-gate 638. Here, the 64K mask bit 625 operates to mask bits 16 . . . 19 from being provided to the 64K compare row signal.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed.

Also, the concepts have been described with reference to specific embodiments. However, one of ordinary skill in the art appreciates that various modifications and changes can be made without departing from the scope of the present disclosure as set forth in the claims below.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method, comprising:
   determining if a translation lookaside buffer data array stores a physical address associated with a first address based on a first tag portion of the first address, the first tag portion associated with a first page size, wherein the determining further comprises:
      performing a first comparison between the first tag portion and a first entry of a translation lookaside buffer tag array, wherein the first entry is selected based upon a first index of the first address; and
      indicating that the translation lookaside buffer data array includes first data when the first tag portion matches the first entry; and
   concurrently determining if the translation lookaside buffer data array stores the physical address associated with the first address based on a second tag portion of the first address, the second tag portion associated with a second page size, wherein the determining further comprises:
      performing a second comparison between the second tag portion and a second entry of the translation lookaside buffer tag array, wherein the second entry is selected based upon a second index of the first address; and
      indicating that the translation lookaside buffer data array includes second data when the second tag matches the second entry.

2. The method of claim 1, wherein indicating that the translation lookaside buffer data array includes the first data further comprises providing a first match indication and indicating that the translation lookaside buffer data array includes the second data further comprises providing a second match indication, and further comprising:
   providing a first entry of the translation lookaside buffer data array based on the first index;
   providing a second entry of the translation lookaside buffer data array based on the second index; and
   selecting from the first entry and the second entry based on the first match indication and the second match indication.

3. The method of claim 2 wherein providing the first match indication comprises providing the second match indication based on first page size information associated with the second entry.

4. The method of claim 3, wherein providing the second match indication comprises providing the second match indication based on second page size information associated with the second entry.

5. The method of claim 1, wherein indicating that the translation lookaside buffer data array includes the first data further comprises providing a first match indication, and further comprising:
   selecting an entry of the translation lookaside buffer data array based on the first match indication; and
   providing the physical address from the selected entry of the translation lookaside buffer data array.

6. The method of claim 1, wherein the translation lookaside buffer comprises a multi-port read content addressable memory.

7. A device comprising
   a memory management unit adapted to concurrently perform N page translations for N different page sizes, the memory management unit comprising:
      a translation lookaside buffer adapted to concurrently provide N entries based on the N different page sizes; and
      a comparison module adapted to:
         compare a first entry of the N entries with a tag from a received address, wherein the first entry is selected based upon a first one of the N page sizes; and
         provide a first hit indication if the first entry matches the first tag.

8. The device of claim 7, wherein the N entries are each provided by the translation lookaside buffer based on a corresponding different one of N index fields of the received address.

9. The device of claim 7, wherein the memory management unit further comprises:
   a translation lookaside buffer data array adapted to receive the first hit indication and to provide a physical address from an entry of the translation lookaside buffer data array in response to receiving the first hit indication.

10. The device of claim 7, wherein:
    the translation lookaside buffer is a set associative translation lookaside buffer; and
    each way is adapted to concurrently provide N entries to the N comparison blocks.

11. The device of claim 7, wherein the first entry includes information adapted to indicate that the first entry is associated with one of the N different page sizes.

12. The device of claim 11, wherein each comparison block is further adapted to:
    determine if the information in the first entry indicates that the first entry is associated with the first page size; and
    provide the first hit indication in response to the determining that the first entry indicates that the first entry is associated with the first page size.

* * * * *